United States Patent [19]

Merritt Jr.

[11] Patent Number: 4,768,903
[45] Date of Patent: Sep. 6, 1988

[54] DOWEL ATTACHMENT

[76] Inventor: Morris L. Merritt Jr., R.D. #1,, Saegertown, Pa. 16433

[21] Appl. No.: 97,825

[22] Filed: Sep. 17, 1987

[51] Int. Cl.$^4$ .......................... B23C 3/04; B23C 1/20; B27C 9/00
[52] U.S. Cl. ..................................... 409/167; 142/32; 144/1 F; 144/134 D
[58] Field of Search ............... 409/167, 165, 163, 164, 409/181, 182, 175, 225, 157, 166; 144/134 D, 1 F, 1 E, 253 R; 408/241 R; 142/32, 48, 31

[56] References Cited

U.S. PATENT DOCUMENTS

| 113,464 | 4/1871 | Sweet | 142/31 X |
|---|---|---|---|
| 2,529,018 | 11/1950 | Hancharik | 142/31 |
| 2,681,086 | 6/1954 | Degen | 142/32 |
| 3,712,174 | 1/1973 | Granfield | 409/138 |
| 4,024,898 | 5/1977 | Bergler et al. | 409/175 |
| 4,099,552 | 7/1978 | Dyball | 144/1.F X |
| 4,279,554 | 7/1981 | Seidenfaden | 409/181 |
| 4,504,178 | 3/1985 | Seidenfaden | 409/180 X |
| 4,538,945 | 9/1985 | Godecke et al. | 409/157 |
| 4,674,548 | 6/1987 | Mills et al. | 144/134 D |

Primary Examiner—William R. Briggs
Attorney, Agent, or Firm—Charles L. Lovercheck; Wayne L. Lovercheck; Dale R. Lovercheck

[57] ABSTRACT

A dowel attachment for a router wherein the attachment is a rectangular body with a bore and a counterbore extending through the body to receive a blank to be formed into a dowel. The bore being adapted to have the finished dowel pass through it. A notch is formed in the rectangular body, perpendicularly and tangent to the bore. The notch receives a driven router bit. An electric drill may be attached to the blank being cut to spin the blank as it is fed through the counterbore and bore.

8 Claims, 2 Drawing Sheets

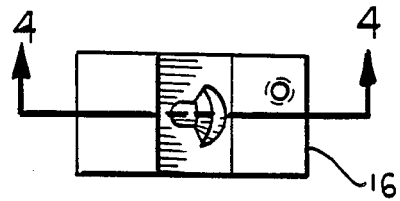
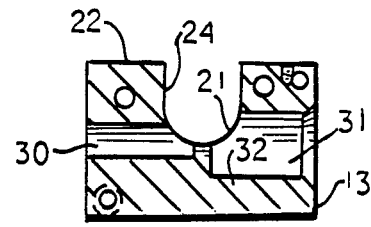
FIG. 3
FIG. 4
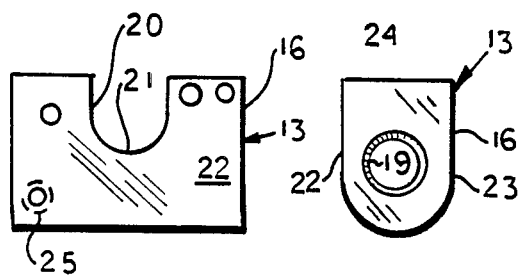
FIG. 5    FIG. 6    FIG. 7
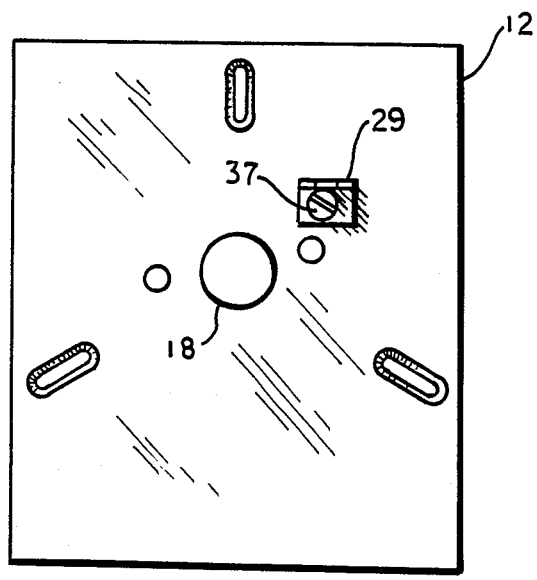
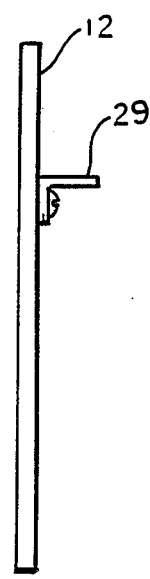
FIG. 8    FIG. 9

DOWEL ATTACHMENT

BACKGROUND OF THE INVENTION

This invention relates to dowel making jigs and more particularly to jigs for economically and simply manufacturing dowel pins in a small manufacturing company, a carpenter shop or a hobby shop. There has been a need for a simple, economical jig for forming dowel pins on a low-production basis. No one has provided such a jig.

REFERENCE TO PRIOR ART

Applicant is aware of the following prior art patents: U.S. Pat. Nos. 3,416,580 to Walter; 3,314,701 to Durham; 3,313,510 to Mudano; 3,234,974 to Ray; 3,219,073 to Epperley; and 3,148,436 to Werth.

STATEMENT OF THE INVENTION

Applicant has provided a simple, efficient and economical jig for forming dowel pins to be attached to an ordinary router so that the router will cut the jig with a minimal amount of work and a "functioning adjustment" for sizing the dowel is provided. The jig is simple, efficient and economical to manufacturer and to use.

OBJECT OF THE INVENTION

The object of the invention is to provide an improved fixture for manufacturing dowel pins.

Another object is to provide a dowel making attachment for use with an ordinary router.

Another object of the invention is to provide a fixture for manufacturing dowell pins that are simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF DRAWINGS

FIG. 3 is a side view of the work holder attachment;

FIG. 4 is a cross-sectional view taken on line 4—4 of FIG. 3;

FIG. 5 is a top view of the dowel pin attachment;

FIG. 6 is an end view of the dowel pin attachment;

FIG. 7 is a bottom view of the attachment shown in FIG. 3;

FIG. 8 is a bottom view of the support plate from the attachment; and

FIG. 9 is a side view of the plate shown in FIG. 8.

DETAILED DESCRIPTION OF THE DRAWINGS

Figure 1:
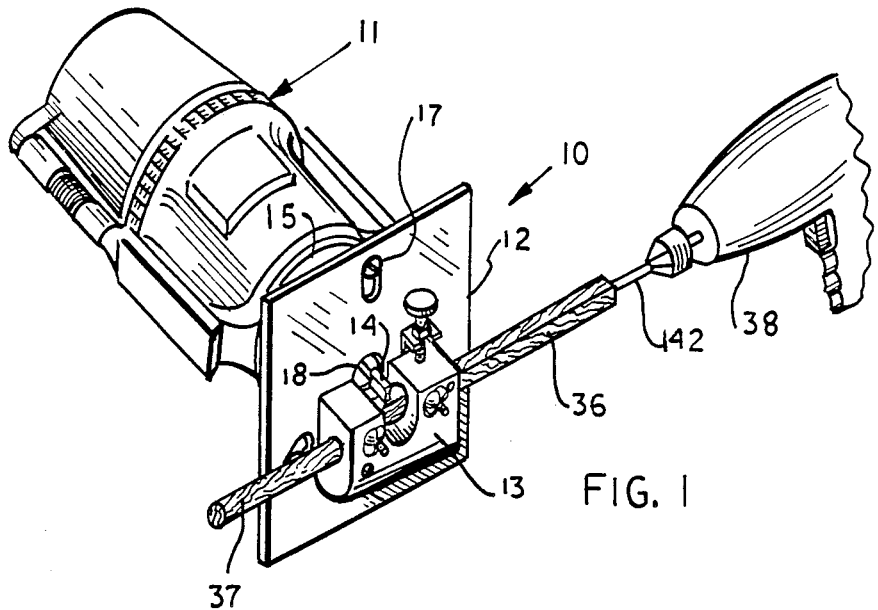
FIG. 1 is an isometric bottom view of the dowel pin attachment for a router according to the invention.
Figure 2:
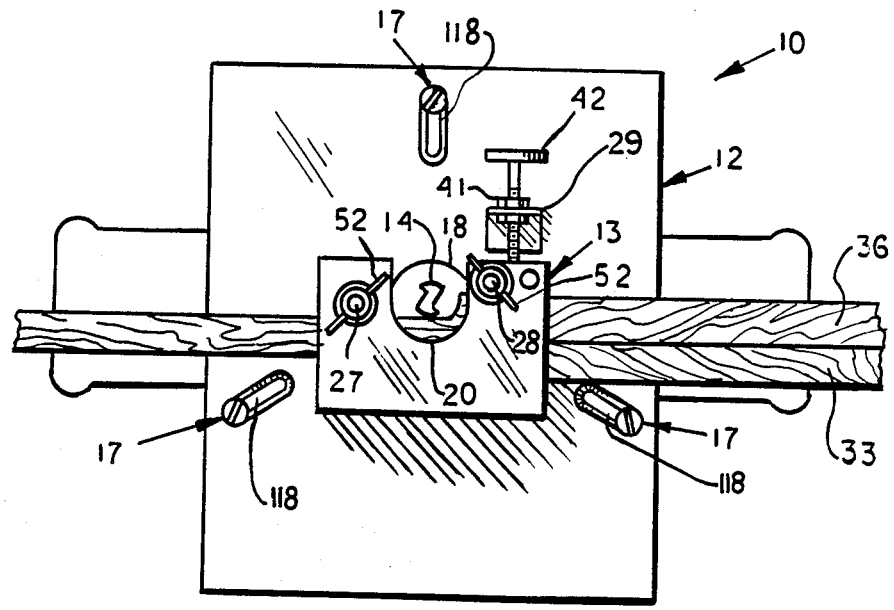
FIG. 2 is a bottom view of the dowel pin attachment shown in FIG. 1.

Now with more particular reference to the drawings, I show a combination 10, of a router 11, a mounting plate 12 and a dowel making attachment 13. The router 11 has a cutting tool 14 rotatably supported thereon.

The router 11 is of a type familiar to those skilled in the art. The router 11 is a common, ordinary router of the type that is frequently found in carpenter shops, hobby shops and the like. A flat mounting surface 15 is like that found on the conventional router 11. The mounting plate 12 is supported on the flat mounting surface 15. The dowel making attachment 13 has a one piece body 16 made of a single block of material such as brass, aluminum, steel or other suitable materials. The mounting plate 12 is attached to the router 11 by means of screws 17 that are received in slots 118. These radially extending slots 118 make it possible to attach the mounting plate 12 to routers with different hole spacing. A central hole 18 is formed in the mounting plate 12. The dowel making attachment 13 has a slot 20 cut out of one side. The slot 20 terminates in a curved recess 21. The curved recess 21 extends from the top surface 24 of the one piece body 16 toward the bottom 25 of the one piece body 16 mounted midway of the length of the one piece body 16.

The cutting tool 14 of the router extends through the central hole 18 of the mounting plate 12 and is aligned with the curved recess 21. A bore 30 is formed in the one piece body 16 perpendicular to the curved recess 21 and a counterbore 31. The cutting tool 14 has a cutting edge extending through said central hole 18 in mounting plate 12 and with its cutting edge tangent to the bore 30. The counterbore 31 joins the bore 30 at the curved recess 21 as shown in FIG. 4. The counterbore 31 is adapted to receive a blank 33 of wood to be cut to form a dowel. The cutting tool 14 is adapted to cut the blank 33 to form the dowel pin 37 having a diameter substantially equal the diameter of the bore 30. An electric hand drill 38 can be attached to end 36 of the blank 33, and as the blank 33 proceeds through the counterbore 31, the blank 33 is cut forming the dowel pin 37. The electric hand drill 38 is connected to the end 36 of the blank 33 by screw 142 which has a screw threaded end to rotate the blank 33 while the blank 33 passes through the bore 30 and counterbore 31.

The blank 33 has a major dimension substantially equal to or less than the diameter of the counterbore 31. The blank 33 may be square or round in cross section.

The one piece body 16 is attached to the mounting plate 12 by threaded members 27 and 28 which are recessed in holes 61 and 62 respectively of mounting plate 12 and extend through holes 61 and 62 in one piece body 16. This allows the dowel making attachment 13 to be adjusted to swing the cutting tool 14 toward or away from the work to fine tune the dowel making attachment 13 and thereby adjust the size of the pin being cut. Hole 61 is of larger diameter that the threaded member 28 which extends through it. Wing nuts 52 are recessed on threaded members 27 and 28 respectively.

This fine tune arrangement is provided to move the blank 33 closer or further from the cutting tool 14 to increase or decrease the size of the dowel pin 37. Adjusting bracket 29 is affixed to the mounting plate 12 by a suitable fastening means. Thumb screw 42 threadably engages adjusting bracket 29 and is attached to mounting plate 12. Lock nuts 41 secure the threaded member 28 in locked postion.

When wing nut 52 on threaded member 27 is loosened, thumb screw 42 will swing one piece body 16 on threaded member 27, thereby moving the bore 30 and counterbore 31 relative to cutting tool 14. When the one piece body 16 is located properly to produce a dowel of the desired diameter, the wing nuts 52 are tightened, locking one piece body 16 in the desired position.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination [10], a router [11], a mounting plate [12] and a dowel making attachment [13], said router [11] having a cutting tool [14] rotatably supported thereon, said router having a flat mounting surface [15], said mounting plate [12] being supported on said flat mounting surface [15], said dowel making attachment [13] having a one piece body [16], said mounting plate [12] having support on said flat mounting surface [15], a central hole [18] in said mounting plate [12], said dowel making attachment [13] having a slot [20] cut in one side and terminating in a curved recess [21]

said body [16] having a top [24] and a bottom [25], said slot [20] extending from said top [24] of said one piece body [16] to said bottom [25] thereof, said cutting tool [14] extending through said central hole [18] and into and curved recess [21], a bore [30] found in said one piece body [16] perpendicular to said curved recess [21] and extending from one end of said one piece body [16], said cutting tool [14] having a cutting edge extending through said central hole [18] with said cutting edge tangent to said bore [30], said bore [30] having a counterbore [31], said counterbore [31] joining said bore [30] at said curved recess [21], said bore [30] being adapted to receive a blank [33] to be cut, said cutting tool [14] being adapted to cut said blank [33] to form a dowel pin [37] of a diameter substantially equal in diameter to the diameter of said bore [30].

2. The combination recited in claim 1 wherein an electrical drill[38] is provided, said electrical drill [38] having means connected to said blank [33] to rotate said blank [33] when said blank is passed through said dowel making attachment [13] and is formed into said dowel.

3. The combination recited in claim 1 wherein said counterbore [31] is adapted to receive said blank [33], said blank [33] having a major dimension substantially equal to the diameter of said counterbore [31].

4. The combination recited in claim 3 wherein said mounting plate [12] comprises threaded members [27, 28] extending through holes [61, 62] in said mounting plate [12] and through said one piece body [16] and threaded fasteners [52] on said threaded members [27, 28] clamping said one piece body [16] to said mounting plate [12].

5. The combination recited in claim 4 wherein adjusting means [29] is provided on said body [16] for adjusting said one piece body [16] relative to said cutting tool [14] whereby the size of said dowel can be changed.

6. The combination recited in claim 5 wherein said adjusting means [29] comprises said holes [61, 62], said holes [61,62] being substantially larger than said threaded members [27, 28] whereby said threaded members can be moved relative to said body and said body [16] can be swung relative to said mounting plate [12] and locked selectively in a plurality of positions.

7. The combination recited in claim 5 wherein said adjusting means [29] comprises an angular member fixed to said mounting plate [12], and a threaded member [42] threadably engaging said angular member and said one piece body [16].

8. The combination recited in claim 1 wherein said mounting plate [12] is supported on said router [11] by means of a plurality of screws [17] in slots [20], said slots [20] radiating outwardly from said central hole [18], and screws [17] received in said slots [20] holding said mounting plate [12] to said router [11].

* * * * *